Jan. 25, 1966     H. W. JANSSEN     3,230,616
METHOD OF WELDING REPLACEMENT ELEMENTS SUCH AS GROUSER
BARS, DRIVE SPROCKET RIMS, AND REPLACEMENT
ELEMENT THEREFOR
Filed Jan. 13, 1964

INVENTOR.
HARVEY W. JANSSEN
BY
Bruce & Brosler
HIS ATTORNEYS

United States Patent Office 3,230,616
Patented Jan. 25, 1966

3,230,616
METHOD OF WELDING REPLACEMENT ELEMENTS SUCH AS GROUSER BARS, DRIVE SPROCKET RIMS, AND REPLACEMENT ELEMENT THEREFOR
Harvey W. Janssen, Lafayette, Calif., assignor to L & B Welding Equipment, Inc., a corporation of California
Filed Jan. 13, 1964, Ser. No. 337,391
2 Claims. (Cl. 29—401)

My invention relates to the servicing of worn items such as grousers, drive sprockets and the like, and more particularly to the replacement of worn portions thereof.

Present practice in the servicing of such items, following removal of a worn portion thereof, is to replace the worn portion by the new element and welding the same along one side to the base structure, and then reversing the base structure and welding the new element thereto along the other side thereof. This is customarily accomplished by supporting the replacement element in a horizontal position during the welding operations, as such positioning facilitates the application and guidance of the welding head along the desired welding path.

Such procedure however, is necessarily slow, uneconomical, and in many instances could result in a weak or defective product, in that the resulting welds are usually shallow, leaving intermediate areas where welding does not take place. Also, the uneven heating could result in stresses and distortion upon cooling, thus necessitating subsequent treatment to remedy the same.

Among the objects of my invention are:

(1) To provide a novel and improved method of servicing worn devices such as grousers, drive sprockets, . . . etc.;

(2) To provide a novel and improved method of welding replacement elements such as grouser bars, sprocket rims, . . . etc. to their respective base structure;

(3) To provide a novel and improved method of welding replacement elements such as grouser bars, sprocket rims, . . . etc. to their respective base structures, which method will be faster and more economical than known conventional methods;

(4) To provide a novel and improved method of welding replacement elements on grousers, drive sprockets, . . . etc., which method will result in deeper and more perfect and stronger welds;

(5) To provide a novel and improved method of welding replacement elements on grousers, drive sprockets, . . . etc., which method will produce a more symmetrical distribution of heat during welding, with consequent minimizing of stress and accompanying distortion in the finished device;

(6) To provide a novel and improved method of welding replacement elements on grousers, drive sprockets, . . . etc., which method will minimize the quantity of weld metal required;

(7) To provide a novel and improved method of welding replacement elements on grousers, drive sprockets, . . . etc., which method will permit of a complete welding operation in one pass;

(8) To provide a novel and improved replacement element for devices such as grousers, drive sprockets, . . . etc.; and (9) To provide a novel and improved replacement element for devices such as grousers, drive sprockets, . . . etc., which permits of the welding thereof to the basic structure in one pass.

Additional objects of my invention will be brought out in the following description of a preferred embodiment of the same, taken in conjunction with the accompanying drawings wherein.

Figure 1:
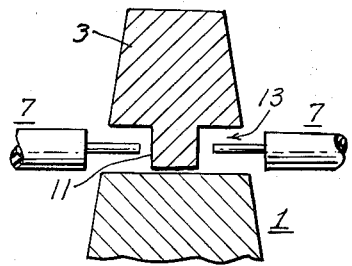
FIG. 1 is a view in section through a replacement grouser bar adapted to the method of the present invention and showing its relationship to the base structure in the process of being welded thereto.
Figure 2:
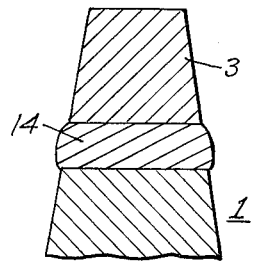
FIG. 2 is a corresponding view depicting the weld resulting from the method of the present invention.

Referring to the drawings for details of the invention in its preferred form, the method, when applied to the servicing of a grouser 1, involves as a replacement element, a grouser bar 3 which is preferably supported in a vertical plane with its region of attachment adjacent the base structure or grouser pad 5, to which it is to be welded, and with the replacement element thus supported, welding is accomplished simultaneously along both sides of the replacement element, where the replacement element approaches the base structure, by simultaneous use of a pair of welding heads 7.

Such simultaneous welding not only very materially reduces the time element involved, over the prior art method where welding proceeded along one side at a time, but such simultaneous welding results in symmetrical application of heat, and thus minimizes stress and distortion in the completed article.

Aside from the reduction in time, attributable to the simultaneous welding along both sides of the replacement element, further economies are realized over the prior art procedure, wherein during the time interval elapsing between the welding operations on both sides of the replacement element, substantial cooling occurs, resulting in substantial loss of heat from around the region of welding, and this must be replenished in accomplishing the second welding operation.

In accordance with the method of the present invention, each welding head develops a heat wall against which the other works, thereby minimizing heat loss, and further cutting down the time devoted to welding.

The method described above, I have found, can be made even more effective as to economy, in addition to assuring a more effective weld, by forming the replacement element with a symmetrically disposed fusion rib 11 along the region of attachment of the replacement element to the base structure, such rib being substantially rectangular in section and of a height of the order ⅛ inch.

Prior art replacement elements have each been formed with arcuately recessed edges along the region of attachment of the element, but this resulted in a tapering rib having a width at its base, equal to the width of the replacement element and a resulting height considerably in excess of ⅛ of an inch or thereabouts as contemplated by the present invention. With such resulting mass of metal in the base of the rib, which is in broad heat conductive relationship to the body of the replacement element above, e.g., throughout the entire width of such element, actual depth of the finished welds is in many instances, only of the order of 50% penetration, and particularly when the welding is accomplished in accordance with prior art practice of welding one side at a time.

With a substantially rectangular fusion rib of the character described as being adapted to the method of the present invention, and by resorting to simultaneous welding from both sides in the manner described above, the entire rib can be readily fused clear through, and intermixed with the metal of the base structure and added weld metal, to produce a homogeneous joint 14 along the region of attachment.

It may readily be appreciated further, that a replacement element having the contemplated rib structure described above, presents to each welding head, when the replacement element is positioned for welding to the base structure, a narrow groove 13 closely matching the height of the rib, and, therefore, the quantity of weld metal necessary to fill such groove in forming the welded joint, will be considerably less than that required by prior art replacement elements formed with arcuate edge recesses having radii of curvature necessarily far in excess ⅛ inch.

The narrow spacing and the reduction in quantity of welding metal required to fill such spacing in the welding of the replacement element to the base structure, adds much toward realizing the advantage over the prior art method, in enabling the completion of a welded joint in one pass.

Figure 3:
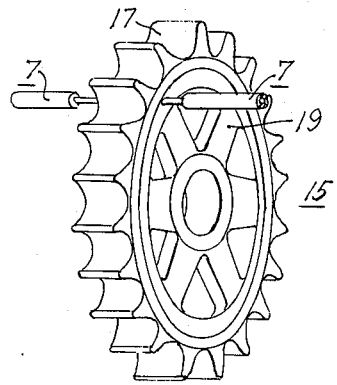
FIGS. 3 and 4 are views corresponding to FIGURES 1 and 2 respectively, but depicting the invention as applied to the servicing of a drive sprocket.
Figure 4:
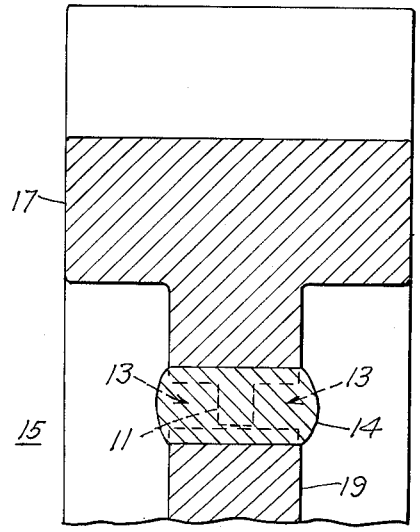

In FIGURES 3 and 4, wherein the invention has been illustrated as applied to the servicing of a drive sprocket 15, the replaceable element will be a toothed rim 17, which following removal of the worn rim, will be disposed about the remaining base structure 19, also preferably in a vertical plane and welded to such base structure by rotating the same between a pair of welding heads.

Like with the grouser bar of FIG. 1, the sprocket rim will preferably be formed with a similar fusion rib, thus forming a narrow groove along the path to be traversed by each welding head, and affording the same advantages.

From the foregoing description of the method involved in the present invention, and the particular replacement element adapted to the practice of this method, it will be appreciated that the present invention offers striking advantages over prior art methods, and that while the same has been illustrated and described in its preferred form, the invention is subject to alteration and modification without departing from the underlying principles involved, and I accordingly do not desire to be limited in my protection to the specific details illustrated and described, except as may be necessitated by the appended claims.

I claim:
1. The method of welding a replacement element such as a grouser bar, sprocket rim, and the like to a base structure, comprising
 forming said replacement element with a symmetrically located fusion rib along the region of attachment of said element,
 said fusion rib being substantially rectangular in section and running longitudinally of said member,
 positioning said element along its intended location of attachment thereof to said base structure,
 then simultaneously welding said element to said base structure from both sides and in like manner, to maintain symmetry of application of welding heat thereto, and at a rate to effect substantially complete fusion of said rib in one pass, in the welding of said replacement element to said base structure.

2. The method of welding a replacement element such as a grouser bar, sprocket rim, and the like to a base structure, comprising
 forming said replacement element with a symmetrically located fusion rib along the region of attachment of said element,
 said fusion rib being substantially rectangular in section and of a height of the order of ⅛ inch,
 positioning said element along its intended location of attachment thereof to said base structure with said element in a vertical plane,
 then simultaneously welding said element to said base structure from both sides and in like manner, to maintain symmetry of application of welding heat thereto, and at a rate to effect substantially complete fusion of said rib in one pass, in the welding of said replacement element to said base structure.

References Cited by the Examiner
UNITED STATES PATENTS

| | | | |
|---|---|---|---|
| 1,091,479 | 3/1914 | Bucknam | 29—498 |
| 1,406,110 | 2/1922 | Troutner | 29—483 X |
| 1,935,063 | 11/1933 | Scott | 29—482 |
| 2,401,722 | 6/1946 | Clapp et al. | 219—73 X |
| 2,667,559 | 1/1954 | Arnold | 219—137 |
| 2,874,005 | 2/1959 | Engstrom | 29—401 X |
| 2,955,353 | 10/1960 | Gross | 29—497 X |

WHITMORE A. WILTZ, *Primary Examiner.*
THOMAS H. EAGER, *Examiner.*